United States Patent Office 3,344,134
Patented Sept. 26, 1967

3,344,134
AZABICYCLONONANECARBOTHIOLATES
John J. D'Amico, Charleston, W. Va., assignor to Monsanto Company, St. Louis, Mo., a corporation of Delaware
No Drawing. Filed Apr. 29, 1964, Ser. No. 363,631
18 Claims. (Cl. 260—239)

The present invention relates to a new and valuable class of chemical products, namely, azabicyclononanecarbothiolates. More particularly, the invention relates to azabicyclononanecarbothiolic acid and derivatives thereof. The free acid decomposes at ordinary temperatures but forms stable derivatives; for example, salts and esters.

The new compounds are prepared from 3-azabicyclo[3.2.2]nonane which will be hereinafter referred to as "amine" unless some other amine is indicated. Condensation of the amine with carbonoxysulfide in the presence of salt-forming base yields salts. The quantity of base should be sufficient to neutralize the acid formed. Suitable bases include the amine itself, ammonium hydroxide, alkali-metal hydroxides and carbonates, alkaline-earth hydroxides, triethylamine, pyridine, and tributylamine. These are, of course, only illustrative. The reaction takes place in aqueous medium in which alkali-metal, ammonium, and substituted-ammonium salts are soluble. Addition of ionizable water-soluble salts of heavy metals precipitates the heavy metal salts from solution. Such heavy metal water-insoluble salts comprise Zn, Cd, Cu, Pb, and Fe salts. A convenient method for making esters is to condense a salt of the carbothiolic acid with an organic halide. Alternatively, an organic thiocarbonyl halide is condensed with the amine. Both methods are hereinafter illustrated in detail. Another feasible synthesis is to convert the amine to the corresponding thiocarbonyl chloride by reaction with phosgene and condense the product with a mercaptan. The new products will perhaps be more readily understood by reference to the following formula:

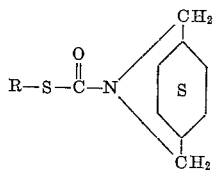

where R is metal, ammonium, substituted ammonium, or an organic radical, a carbon atom of which is attached to the sulfur in the above formula. For example, R is an alkyl radical such as methyl, ethyl, propyl, isopropyl, butyl, isobutyl, secondary butyl, tertiary butyl, amyl, isoamyl, secondary amyl, tertiary amyl, hexyl, heptyl, octyl, nonyl, decyl, or dodecyl, although lower alkyl of 1–5 carbon atoms is preferred; R is an aralkyl radical such as benzyl, p-chlorobenzyl, o-chlorobenzyl, m-chlorobenzyl, 2,4-dichlorobenzyl, 3,4-dichlorobenzyl, 2,6-dichlorobenzyl, 2,4,5-trichlorobenzyl, 2,3,6-trichlorobenzyl, 2,4,6-trichlorobenzyl, p-methylbenzyl, o-methylbenzyl, 2,4-dimethylbenzyl, and 2,6-dimethylbenzyl; R is lower alkenyl which includes lower haloalkenyl such as vinyl, allyl, methallyl, 2-butenyl, 2-chloroallyl, 2- bromoallyl, 2-iodoallyl, 3-chloroallyl, 3-iodoallyl, 3-bromoallyl, 3-bromo-2-butenyl, 3,3-dichloroallyl, 2,3,3-trichloroallyl, 3,4,4-trifluoro-3-butenyl, 2,3-dichloroallyl, 2,3-dibromoallyl, 2-fluoro-3-chloroallyl, 3-chloro-2-butenyl, 3-iodo-2-butenyl, 4-chloro-2-butenyl, 2,3-diiodo-2-butenyl, and 2,3-dichloro-2-butenyl; R is lower alkenyl, as for example, 2-propynyl; R is lower alkylthioalkyl preferably of 2–6 carbon atoms, such as methylthiomethyl, methylthioethyl, methylthiopropyl, ethylthiomethyl, ethylthioethyl, ethylthiopropyl, propylthiomethyl, propylthioethyl, and propylthiopropyl; R is lower alkoxyalkyl preferably of 2–6 carbon atoms such as methoxymethyl, methoxyethyl, methoxypropyl, ethoxymethyl, ethoxyethyl, ethoxypropyl, propoxymethyl, propoxyethyl and propoxypropyl (by lower alkylthioalkyl and lower alkoxyalkyl are meant radicals in which neither carbon chain is more than about six carbon atoms and the total is not more than about twelve); R is cycloaliphatic, as for example, cyclohexenyl.

The following examples illustrate the preparation and properties of the new compounds but in no manner are to be construed as limitative.

Example 1

To a reaction vessel is charged 25 grams (0.2 mole) of amine, 21.2 grams (0.2 mole) of sodium carbonate and 400 ml. of ethyl ether. This slurry is stirred at 5–20° C. while adding dropwise to it 25 grams (0.2 mole) of ethyl thiocarbonyl chloride. The reaction mixture is stirred at 25–30° C. for 24 hours, 400 ml. of water added, and stirring continued for 15 minutes. The ether layer is separated, washed with water until neutral, and dried over sodium sulfate. The ether is removed in vacuo at a maximum temperature of 80–90° C./1–2 mm. Ethyl 3-azabicyclo[3.2.2]nonane - 3 - carbothiolate is obtained as an amber oil, insoluble in water but soluble in common organic solvents.

Example 2

Replacing ethyl thiocarbonyl chloride of Example 1 with an equal molecular weight of methyl thiocarbonyl chloride, methyl 3-azabicyclo[3.2.2]nonane-3-carbothiolate is isolated as described. An amber oil insoluble in water but soluble in common organic solvents is obtained.

Example 3

To a reaction vessel is charged 12.5 grams (0.1 mole) of amine, 13.8 grams (0.1 mole) of potassium carbonate and 400 ml. of ethyl ether. This slurry is stirred at 5–10° C. while adding dropwise to it 15.3 grams (0.1 mole) of n-butyl thiocarbonyl chloride. Thereupon the reaction mixture is stirred at 25–30° C. for 24 hours, 300 ml. of water added, and stirring continued for 15 minutes. The ether layer is separated, washed with water until neutral, and dried over sodium sulfate. The ether is removed in vacuo at a maximum temperature of 80–90° C./1–2 mm. n-Butyl 3-azabicyclo[3.2.2]nonane-3-carbothiolate is obtained as an amber oil, insoluble in water but soluble in common organic solvents.

Employing substantially the same reaction conditions and replacing the n-butyl thiocarbonyl chloride with an equimolar amount, respectively, of isopropyl thiocarbonyl chloride, octyl thiocarbonyl chloride, and tert.-butyl thiocarbonyl chloride, the following further examples are formed.

Example 4

Isopropyl 3-azabicyclo[3.2.2]nonane - 3 - carbothiolate, an oil which solidifies on cooling. After drying on a porous plate the white solid melts at 40–41° C. It is insoluble in water but soluble in common organic solvents.

Example 5

Octyl 3-azabicyclo[3.2.2]nonane - 3 - carbothiolate, an amber oil insoluble in water but soluble in common organic solvents.

Example 6

Tert.-butyl 3-azabicyclo[3.2.2]nonane-3-carbothiolate, a white solid, M.P. 87–88° C. after recrystallization from dilute alcohol. It is insoluble in water but soluble in common organic solvents.

Example 7

There is charged to a reactor 12.5 grams (0.1 mole) of amine, 16 grams (0.1 mole) of 25% sodium hydroxide and 100 ml. of water. To the stirred charge is bubbled in 7.8 grams (0.11 mole) of 85% COS over a period of 10 minutes. The reaction mixture is kept at 0–10° C. during the addition. To sodium 3-azabicyclo[3.2.2]nonane-3-carbothiolate so produced, there is then added in one portion 19.6 grams (0.1 mole) of 2,6-dichlorobenzyl chloride. The temperature of the reaction mixture is maintained at 0–10° C. the first hour, 10–15° C. the second hour, 15–20° C. the third hour 20–25° C. the fourth hour, and 25–30° C. the fifth hour. Then 200 ml. of water is added and stirring continued for 15 minutes. The precipitate is collected by filtration, washed with water until neutral, and air-dried at 25–30° C. 2,6-dichlorobenzyl 3-azabicyclo[3.2.2]nonane-3-carbothiolate is obtained as a light tan solid, M.P. 140–141° C. after recrystallization from alcohol. It is insoluble in water, heptane, and ether but soluble in chloroform, benzene, hot acetone, hot ethanol, and hot ethyl acetate.

Employing substantially the same reaction conditions and replacing the 2,6-dichlorobenzyl chloride with an equimolar amount, respectively, of 2,3,6-trichlorobenzyl chloride and benzyl chloride, respectively, further examples are prepared as follows:

Example 8

2,3,6-trichlorobenzyl 3-azabicyclo[3.2.2]nonane-3-carbothiolate, a white solid melting at 96–97° C. after recrystallization from alcohol. It is insoluble in water but soluble in ether, acetone, chloroform, benzene, ethyl acetate, hot heptane, and hot ethanol.

Example 9

Benzyl 3-azabicyclo[3.2.2]nonane-3-carbothiolate, a white solid melting at 69–70° C. after recrystallization from heptane. It is insoluble in water but soluble in common organic solvents.

Example 10

In the procedure of Example 7, the charge is 32.6 grams (0.26 mole) of amine, 32 grams (0.2 mole) of 25% sodium hydroxide, 100 ml. of water, 15.8 grams (0.225 mole) of 85% COS and 24.7 grams (0.2 mole) of propyl bromide. The COS is bubbled in over a period of 24 minutes. The temperature of the stirred reaction mixture is maintained at 0–10° C. the first hour, 10–15° C. the second hour, 15–20° C. the third hour, 20–25° C. the fourth hour, and 25–30° C. for 20 hours. It is then extracted with 400 ml. of ethyl ether. The ether layer which separates is washed with water until neutral to litmus and dried over sodium sulfate. The ether is removed in vacuo at a maximum temperature of 80–90° C./1–2 mm. Propyl 3-azabicyclo[3.2.2]nonane-3-carbothiolate is obtained as an amber oil, insoluble in water but soluble in common organic solvents.

Example 11

To a stirred slurry comprising 12.5 grams (0.1 mole) of amine, 16 grams (0.1 mole) of 25% sodium hydroxide and 100 ml. of water is bubbled in at 0–10° C., in 10 minutes, 7.8 grams (0.11 mole) of 85% COS. There is then added in one portion 18 grams (0.1 mole) of 2,3,3-trichloroallyl chloride. The temperature of the stirred reaction mixture is maintained at 0–10° C. the first hour, 10–15° C. the second hour, 15–20° C. the third hour, 20–25° C. the fourth hour, and 25–30° C. the fifth hour. Then the reaction mixture is extracted with 300 ml. of ethyl ether, the ether solution separated, washed with water until neutral to litmus and dried over sodium sulfate. The ether is removed in vacuo at a maximum temperature of 80–90° C./1–2 mm. 2,3,3-trichloroallyl 3-azabicyclo[3.2.2]nonane-3-carbothiolate is obtained as an amber oil insoluble in water but soluble in common organic solvents.

Employing substantially the same reaction conditions and replacing the 2,3,3-trichloroallyl chloride with an equimolar amount, respectively, of 2-chloroallyl chloride, cis- and trans-1,2,3-trichloropropane, cis- and trans-1,2,3-tribromopropene, allyl chloride, 2-bromoallyl chloride, chlorodimethyl sulfide, chloromethyl ethyl sulfide, 2-bromoethyl methyl sulfide, chlorodimethylether, bromomethyl ethyl ether, 2-bromoethyl ethyl ether and 3-bromo-2-cyclohexene, further examples are prepared as follows:

Example 12

2-chloroallyl 3-azabicyclo[3.2.2]nonane-3-carbothiolate, an oil which solidifies on standing. After drying on a porous plate it is a white solid melting at 50–51° C. It is insoluble in water but soluble in common organic solvents.

Example 13

Cis- and trans-2,3-dichloroallyl 3-azabicyclo[3.2.2]nonane-3-carbothiolate, a low-melting solid insoluble in water but soluble in common organic solvents.

Example 14

Cis- and trans-2,3-dibromoallyl 3-azabicyclo[3.2.2]nonane-3-carbothiolate, an oil which solidifies on standing. After drying on a porous plate the brown solid melts at 73–78° C. It is insoluble in water but soluble in common organic solvents.

Example 15

Allyl 3-azabicyclo[3.2.2]nonane-3-carbothiolate, a yellow oil insoluble in water but soluble in common organic solvents.

Example 16

2-bromoallyl 3-azabicyclo[3.2.2]nonane-3-carbothiolate, a viscous black oil insoluble in water but soluble in common organic solvents.

Example 17

Methylthiomethyl 3-azabicyclo[3.2.2]-nonane-3-carbothiolate, an oil insoluble in water but soluble in common organic solvents.

Example 18

Ethylthiomethyl 3-azabicyclo[3.2.2]nonane-3-carbothiolate, an oil insoluble in water but soluble in common organic solvents.

Example 19

Methylthioethyl 3-azabicyclo[3.2.2]nonane-3-carbothiolate, an oil insoluble in water but soluble in common organic solvents.

Example 20

Methoxymethyl 3-azabicyclo[3.2.2]nonane-3-carbothiolate, an oil insoluble in water but soluble in common organic solvents.

Example 21

Ethoxymethyl 3-azabicyclo[3.2.2]nonane-3-carbothiolate, an oil insoluble in water but soluble in common organic solvents.

Example 22

Ethoxyethyl 3 - azabicyclo[3.2.2]nonane - 3 - carbothiolate, an oil insoluble in water but soluble in common organic solvents.

Example 23

2-cyclohexenyl 3 - azabicyclo[3.2.2]nonane - 3 - carbothiolate, an oil insoluble in water but soluble in common organic solvents.

Example 24

To a reaction vessel is charged 37.5 grams (0.3 mole) of amine, 40 grams (0.25 mole) of 25% sodium hydroxide and 300 ml. of water. This slurry is stirred at 0–10° C. while adding, over a period of 30 minutes, 19.3 grams (0.275 mole) of 85% COS. There is then added in one portion 22.6 grams (0.25 mole) of 2-methallyl chloride. The temperature of the stirred reaction mixture is maintained at 0–10° C. the first hour, 10–15° C. the second hour, 15–20° C. the third hour, 20–25° C. the fourth hour, and 25–30° C. the fifth hour. Then the reaction mixture is extracted with 500 ml. of ethyl ether, the solids removed by filtration, the ether solution washed with water until neutral and dried over sodium sulfate. The ether is removed in vacuo at a maximum temperature of 80–90° C./1–2 mm. 2-methallyl 3-azabicyclo-[3.2.2]nonane-3-carbothiolate is obtained as an amber liquid insoluble in water but soluble in common organic solvents.

*Example 25*

Substituting an equal molecular weight of 3-bromo-1-propyne for the 2-methallyl chloride in Example 24, the precipitate is collected by filtration, washed with water until neutral and air-dried at 25–30° C. 2-propynyl 3-azabicyclo[3.2.2]nonane - 3 - carbothiolate is obtained in 99% yield as a light tan solid melting at 44–45° C. after recrystallization from dilute alcohol. It is insoluble in water but soluble in common organic solvents.

*Example 26*

In to a pressure vessel is charged 25 grams (0.2 mole) of amine and 15 grams of tetrahydrofuran. There is then passed in 7.8 grams (0.11 mole) of 85% COS at 0–10° C. at atmospheric pressure. The mixture is stirred for about an hour at 0–10° C. The reaction vessel is purged with deoxygenated nitrogen and the reaction mixture heated and stirred at about 130° C. while the pressure is maintained at about 200–240 p.s.i. by acetylene injection. From the reaction mixture vinyl 3-azabicyclo[3.2.2]-nonane-3-carbothiolate is obtained as an amber liquid.

The new esters herein described are valuable herbicides. They are preferably used as pre-emergence herbicides by applying the toxicant to the soil medium. They may be spread on the soil surface or mixed with the top layer of soil for destruction of germinating seedlings. They may be applied in the form of a spray containing the active ingredient in a phytotoxic concentration. Applying the active ingredient in amounts within the range of 1 to 60 pounds per acre is satisfactory for most purposes. The compounds are insoluble in water, but may be dispersed directly in water, or a solution in an organic solvent may be emulsified in aqueous medium by the aid of a dispersing agent. As dispersing and wetting agents there may be employed soft or hard sodium or potassium soaps, alkylated aromatic sodium sulfonates, such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. Petroleum hydrocarbon fractions, especially those high in aromatic constituents, are desirable carriers. Particulate solid carriers may be used where desired, as for example various clays, and the toxicants applied in dust or granular form.

The table below illustrates characteristic herbicidal activity of the compounds of this invention. The toxicant was emulsified in water and the emulsion applied as a spray to seeded flats containing a counted number of seeds. The active ingredient was applied at a dosage of five pounds per acre and the phytotoxicity observed. Severe phytotoxicity means that 76–100% of the seedlings were destroyed based upon the number expected from the germination characteristics of the particular seed lot used. Moderate phytotoxicity means that 51–75% of the seedlings were destroyed.

TABLE I

| Active Ingredient | Results Observed |
| --- | --- |
| Ethyl 3-azabicyclo[3.2.2]-nonane-3-carbothiolate. | Severe phytotoxicity to brome grass, wild oat, rye grass, wild buckwheat, foxtail, crab grass, and sorghum; moderate phytotoxicity to pigweed and soybean. |

TABLE I—Continued

| Active Ingredient | Results Observed |
| --- | --- |
| Methyl 3-azabicyclo[3.2.2.]-nonane-3-carbothiolate. | Severe phytotoxicity to morning glory, wild oat, brome grass, foxtail, crab grass, and sorghum; moderate phytotoxicity to rye grass, pigweed and soybean. |
| n-Butyl 3-azabicyclo[3.2.2]-nonane-3-carbothiolate. | Severe phytotoxicity to barnyard grass, radish, crab grass and sorghum; moderate phytotoxicity to soybean, tomato, foxtail, wild oat and morning glory. |
| Isopropyl 3-azabicyclo[3.2.2]-nonane-3-carbothiolate. | Severe phytotoxicity to barnyard grass, wild oat, foxtail, crab grass, brome grass, rye grass, soybean and sorghum; moderate phytotoxicity to pigweed and morning glory. |
| Tert-butyl 3-azabicyclo-[3.2.2]nonane-3-carbothiolate. | Severe phytotoxicity to wild oat, brome grass, foxtail, crab grass, sorghum, and barnyard grass; moderate phytotoxicity to rye grass. |
| 2,6-dichlorobenzyl-3-azabicyclo[3.2.2]nonane-3-carbothiolate. | Severe phytotoxicity to foxtail and crab grass; moderate phytotoxicity to brome grass, rye grass, and pigweed. |
| 2,3,6-trichlorobenzyl 3-azabicyclo[3.2.2]nonane-3-carbothiolate. | Severe phytotoxicity to morning glory, radish, foxtail, and crab grass; moderate phytotoxicity to brome grass, sugar beets, pigweed, and sorghum. |
| Benzyl 3-azabicyclo[3.2.2]-nonane-3-carbothiolate. | Severe phytotoxicity to wild oat, foxtail, crab grass, and sorghum; moderate phytotoxicity to radish and sugar beets. |
| Propyl 3-azabicyclo[3.2.2]-nonane-3-carbothiolate. | Severe phytotoxicity to wild oat, cotton, corn, barnyard grass, soybean, brome grass, rye grass, sugar beets, foxtail, crab grass, pigweed, wild buckwheat, and sorghum; moderate phytotoxicity to morning glory, radish, and tomato. |
| 2,3,3-trichloroallyl-3-azabicyclo[3.2.2]nonane-3-carbothiolate. | Moderate phytotoxicity to radish, foxtail, and crab grass. |
| 2-chloroallyl 3-azabicyclo[3.2.2]nonane-3-carbothiolate | Severe phytotoxicity to wild oat; moderate phytotoxicity to foxtail and crab grass. |
| Cis- and trans-2,3-dichloroallyl 3-azabicyclo[3.2.2]-nonane-3-carbothiolate. | Severe phytotoxicity to wild oat; moderate phytotoxicity to foxtail and crab grass. |
| Cis- and trans-2,3-dibromoallyl 3-azabicyclo[3.2.2]-nonane-3-carbothiolate. | Severe phytotoxicity to wild oat; moderate phytotoxicity to crab grass. |
| Allyl 3-azabicyclo[3.2.2]-nonane-3-carbothiolate. | Severe phytotoxicity to foxtail, crab grass, and sorghum; moderate phytotoxicity to brome grass, rye grass, sugar beets, and soybean. |
| 2-bromoallyl 3-azabicyclo-[3.2.2]nonane-3-carbothiolate. | Severe phytotoxicity to brome grass, foxtail, crab grass, and sorghum; moderate phytotoxicity to radish. |
| 2-methallyl 3-azabicyclo[3.2.2]nonane-3-carbothiolate. | Severe phytotoxicity to barnyard grass, crab grass, and soybean; moderate phytotoxicity to morning glory, foxtail, and tomato. |
| 2-propynyl 3-azabicyclo[3.2.2]nonane-3-carbothiolate. | Severe phytotoxicity to barnyard grass, sorghum, and pigweed; moderate phytotoxicity to sugar beets, crab grass, and soybean. |

Isopropyl 3-azabicyclo[3.2.2]nonane - 3 - carbothiolate was severly toxic to barnyard grass at 4 lbs./acre at which dosage it was not toxic to rice. Severe phytotoxicity to barnyard grass was retained down to 2 lbs./acre. The toxicant is especially useful for control of this pest in rice. Allyl 3 - azabicyclo[3.2.2]nonane - 3 - carbothiolate is especially effective for control of Johnson grass and retains high activity down to at least ½-lb./acre. Octyl 3-azabicyclo[3.2.2]nonane - 3 - carbothiolate controls foxtail and crab grass. Applied at a dosage of 25 pounds per acre, it was severely toxic to both of these weedy grasses.

Some of the compounds are useful for combating plant diseases and micro-organisms. Bacteriostatic activity was demonstrated against *Staphylococcus aureus*. Each of the test compounds was dissolved in a non-toxic solvent to give respective 1% stock solutions. The stock solutions were then added to nutrient agar in a quantity to give 1 part of product per 1,000 parts of agar. After thorough mixing, the agar was poured into Petri dishes and allowed to harden. One drop of a cell suspension of the bacteria served as inoculum for each plate. The inoculated plates were incubated for 2 days at a temperature of 37° C. At the end of that time inspection of the plates showed complete inhibition of growth of *Staphylococcus aureus* employing the following test materials:

Ethyl 3-azabicyclo[3.2.2]nonane-3-carbothiolate

Methyl 3-azabicyclo[3.2.2]nonane-3-carbothiolate
n-Butyl 3-azabicyclo[3.2.2]nonane-3-carbothiolate
Isopropyl 3-azabicyclo[3.2.2]nonane-3-carbothiolate
Tert.-butyl 3-azabicyclo[3.2.2]nonane-3-carbothiolate
Propyl 3-azabicyclo[3.2.2]nonane-3-carbothiolate
2-methallyl 3-azabicyclo[3.2.2]nonane-3-carbothiolate
2-propynyl 3-azabicyclo[3.2.2]nonane-3-carbothiolate Fungistatic activity was demonstrated against *Aspergillus niger*. In this test the test chemicals were mixed in pre-determined concentrations with hot dextrose agar which was subsequently poured into Petri dishes, cooled, and allowed to harden. The nutrient agar containing the test compound was then inoculated with the fungus organism and the samples incubated for 5 days at 25° C. Growth of the fungus was suppressed by ethyl 3-azabicyclo[3.2.2]nonane-3-carbothiolate and methyl 3-azabicyclo[3.2.2]nonane-3-carbothiolate at a concentration of 1 part per 1,000 parts of the agar.

Cis- and trans-2,3-dichloroallyl 3-azabicyclo[3.2.2]-nonane-3-carbothiolate protected apple foliage from *Venturia inaequalis*, causative organism of apple scab. A 1.0% stock solution of the test chemical in a nontoxic solvent was made up and an aliquot thereof diluted to the desired concentration and applied to the leaves of new growth of apple seedlings. Twenty-four hours later conidia of *Venturia inaequalis* was sprayed on the same foliage. The inoculation was obtained from four isolates of Venturia representing the three races and a wild isolate, all cultured on potato dextrose broth and harvested after four weeks growth. Spores from all cultures were mixed and the spore load adjusted to 10,000 spores/1 ml. The inoculated plants were then incubated in a greenhouse chamber and disease incidence recorded after 14–20 days' incubations. Perfect control at 30 p.p.m. was observed.

2-methallyl 3-azabicyclo[3.2.2]nonane - 3 - carbothiolate and 2-propynyl 3-azabicyclo[3.2.2]nonane-3-carbothiolate were tested against the soil fungus *Rhyizoctonia solani*. Testing was conducted by blending cornmeal-sand cultures of the organism into autoclave-sterilized soil to achieve essentially a mono-organism soil-type. Soufflé cups with a capacity of 30 grams were filled with the soil-type and 4 ml. of the experimental chemical (231 p.p.m.) were drenched over the surface of each. The final concentration based on soil weight is 30 p.p.m. The soufflé cups were then put into pans and these pans placed into an incubation chamber (90–100% relative humidity) for 48 hours. At the end of this time the treatments were observed and the results recorded. A similar testing procedure was conducted with similar soil which had not been chemically treated. Slight growth on cornmeal-sand particles only was observed with both test materials whereas normal growth was observed with the soil which had not been chemically treated.

Similar testing of methyl 3-azabicyclo[3.2.2]-nonane-3-carbothiolate and propyl 3-azabicyclo[3.2.2]nonane-3-carbothiolate against the soil fungus *Pythium ultimum* showed slight growth on cornmeal-said particles whereas normal growth was observed with the untreated soil.

It is intended to cover all changes and modifications of the examples of the invention herein chosen for purposes of disclosure which do not constitute departures from the spirit and scope of the invention.

What is claimed is:
1. Azabicyclononanecarbothiolates of the formula

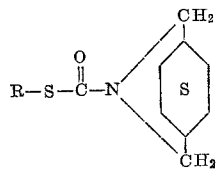

where R is selected from a group consisting of alkyl of 1 to 12 carbon atoms, inclusive, lower alkoxyalkyl, lower alkylthioalkyl, lower alkenyl, lower haloalkenyl, lower alkynyl, cyclohexenyl, benzyl, chlorobenzyl containing 1 to 3 chlorine atoms, inclusive, monomethylbenzyl, and dimethylbenzyl.

2. Azabicyclononanecarbothiolates of the formula

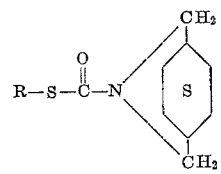

where R is alkyl of 1 to 12 carbon atoms, inclusive.

3. The compounds of claim 2 where the alkyl group contains 1–5 carbon atoms, inclusive.

4. Aralkyl 3 - azabicyclo[3.2.2]nonanecarbothiolates, where the aralkyl radical is

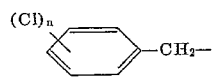

where *n* is an integer from 0 to 3, inclusive.

5. Lower alkenyl 3-azabicyclo[3.2.2]nonanecarbothiolate.

6. Haloloweralkenyl 3-azabicyclo[3.2.2]nonanecarbothiolate.

7. Sodium 3-azabicyclo[3.2.2]nonanecarbothiolate.

8. Lower alkynyl 3-azabicyclo[3.2.2]nonanecarbothiolate.

9. Lower alkylthioloweralkyl 3-azabicyclo[3.2.2]-nonanecarbothiolate.

10. Lower alkoxyloweralkyl 3 - azabicyclo[3.2.2]-nonanecarbothiolate.

11. Cyclohexenyl 3 - azabicyclo[3.2.2]nonanecarbothiolate.

12. n-Butyl 3-azabicyclo[3.2.2]nonane -3-carbothiolate.

13. Propyl 3-azabicyclo[3.2.2]nonane-3-carbothiolate.

14. 2,3,6-trichlorobenzyl 3-azabicyclo[3.2.2]-nonane-3-carbothiolate.

15. 2,6-dichlorobenzyl 3 - azabicyclo[3.2.2]nonane-3-carbothiolate.

16. Allyl 3-azabicyclo[3.2.2]nonane-3-carbothiolate.

17. 2-bromoallyl 3 - azabicyclo[3.2.2]nonane-3-carbothiolate.

18. Azabicyclononanecarbothiolates of the formula

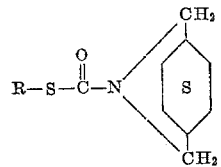

where R is selected from a group consisting of ammonium, alkali metal, alkaline earth metal, zinc, cadmium, copper, lead, iron, and amine addition salt-forming radicals, the amine being selected from a group consisting of 3-azabicyclo[3.2.2]nonane, triethylamine, tributylamine, and pyridine.

References Cited
UNITED STATES PATENTS

| | | | |
|---|---|---|---|
| 2,160,880 | 6/1939 | Loane et al. | 260—455 |
| 2,965,637 | 12/1960 | Westland | 260—239 |
| 2,992,091 | 7/1961 | Harman et al. | 260—455 |
| 3,028,378 | 4/1962 | Testa et al. | 260—239 |
| 3,066,020 | 11/1962 | Tilles et al. | 71—2.5 |
| 3,069,253 | 12/1962 | Sousa | 71—2.5 |

ALTON D. ROLLINS, *Primary Examiner*.

A. J. ADAMCIK, *Assistant Examiner*.